United States Patent
Greulich et al.

(10) Patent No.: US 11,155,478 B2
(45) Date of Patent: Oct. 26, 2021

(54) METHOD FOR IMPROVING OVERFLOW CLARITY IN PRODUCTION OF COAL

(71) Applicant: Ecolab USA Inc., St. Paul, MN (US)

(72) Inventors: Christopher Ryan Greulich, Tucson, AZ (US); Kevin McDonald, North Aurora, IL (US); Weiguo Cheng, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 43 days.

(21) Appl. No.: 15/648,891

(22) Filed: Jul. 13, 2017

(65) Prior Publication Data

US 2018/0016166 A1 Jan. 18, 2018

Related U.S. Application Data

(60) Provisional application No. 62/362,924, filed on Jul. 15, 2016.

(51) Int. Cl.

| | |
|---|---|
| *C02F 1/56* | (2006.01) |
| *C08F 220/06* | (2006.01) |
| *C08F 220/56* | (2006.01) |
| *C10G 1/04* | (2006.01) |
| *C02F 1/00* | (2006.01) |
| *C02F 101/10* | (2006.01) |
| *C02F 103/10* | (2006.01) |
| *B03D 3/06* | (2006.01) |

(52) U.S. Cl.
CPC .............. *C02F 1/56* (2013.01); *C08F 220/06* (2013.01); *C08F 220/56* (2013.01); *C02F 2001/007* (2013.01); *C02F 2101/10* (2013.01); *C02F 2103/10* (2013.01); *C10G 1/04* (2013.01)

(58) Field of Classification Search
None
See application file for complete search history.

(56) References Cited

U.S. PATENT DOCUMENTS

| | | |
|---|---|---|
| 3,717,574 A | 2/1973 | Werneke |
| 4,162,966 A | 7/1979 | Finch |

(Continued)

FOREIGN PATENT DOCUMENTS

| | | |
|---|---|---|
| CA | 2857352 A | 1/2015 |
| CN | 104645723 A | 5/2015 |

(Continued)

OTHER PUBLICATIONS

"A Viscosity Primer: Viscosity Definitions", pp. 1-3, accessed online at: https://www.che.utah.edu/site-specific-resources/chemical-engineering/department_equipment/Projects_Lab/A_Viscometers/ViscosityDefinitions.pdf on Jul. 31, 2020. (Year: 2020).*

(Continued)

*Primary Examiner* — Clare M Perrin
(74) *Attorney, Agent, or Firm* — Kagan Binder, PLLC

(57) ABSTRACT

A transitional treatment composition and methods of treating coal refuse are provided. The transitional treatment composition comprises an anionic acrylate-acrylamide copolymer having from about 30 mole percent to about 50 mole percent (meth)acrylate, from about 50 mole percent to about 70 mole percent (meth)acrylamide, and a reduced specific viscosity of from about 18 dL/g to about 30 dL/g. The transitional treatment composition can be made down in an aqueous liquid.

19 Claims, 5 Drawing Sheets

(56) References Cited

U.S. PATENT DOCUMENTS

| | | | |
|---|---|---|---|
| 4,210,531 A * | 7/1980 | Wang | C02F 1/54 209/5 |
| 4,342,653 A | 8/1982 | Halverson | |
| 4,555,329 A | 11/1985 | Sykes et al. | |
| 4,599,390 A | 7/1986 | Fan et al. | |
| 4,704,209 A | 11/1987 | Richardson et al. | |
| 4,720,346 A * | 1/1988 | Flesher | C02F 1/52 210/734 |
| 4,786,318 A | 11/1988 | Owen et al. | |
| 4,913,775 A | 4/1990 | Langley et al. | |
| 5,296,006 A | 3/1994 | Reed et al. | |
| 5,368,745 A * | 11/1994 | Rothenberg | C02F 1/54 210/734 |
| 5,441,649 A | 8/1995 | Sommese et al. | |
| 5,603,841 A | 2/1997 | Kerr | |
| 5,622,533 A * | 4/1997 | Sommese | B01D 21/01 44/620 |
| 5,622,647 A | 4/1997 | Kerr et al. | |
| 5,653,886 A | 8/1997 | Kerr et al. | |
| 5,779,910 A | 7/1998 | Donlin | |
| 6,191,242 B1 | 2/2001 | Ryles et al. | |
| 6,485,651 B1 | 11/2002 | Branning | |
| 6,544,425 B2 | 4/2003 | Miller | |
| 6,667,374 B2 | 12/2003 | Hernandez-Barajas et al. | |
| 6,753,388 B1 | 6/2004 | Whipple et al. | |
| 7,566,469 B2 * | 7/2009 | Scheimann | C12F 3/10 210/733 |
| 2004/0035800 A1 * | 2/2004 | Weir | C02F 1/56 210/723 |
| 2005/0079270 A1 | 4/2005 | Scheimann | |
| 2007/0210007 A1 | 9/2007 | Scheimann et al. | |
| 2011/0188935 A1 | 8/2011 | McColl et al. | |
| 2012/0125859 A1 * | 5/2012 | Collins | B01D 17/0217 210/708 |
| 2014/0054232 A1 * | 2/2014 | Duttlinger, Jr. | C02F 1/54 210/710 |
| 2015/0167245 A1 | 7/2015 | Cheng et al. | |

FOREIGN PATENT DOCUMENTS

| | | |
|---|---|---|
| CN | 105754670 A | 7/2016 |
| RU | 2086766 C1 | 8/1997 |
| SU | 1713612 A1 | 2/1992 |
| WO | WO 02/079099 A1 | 10/2002 |

OTHER PUBLICATIONS

Sabah et al. (International Journal of Mineral Processing, 2004, 74, 303-315). (Year: 2004).*

Burr et al., "Starch Graft Copolymers for Water Treatment," *Die Stärke*, No. 5, pp. 155-159 (1975).

European Patent Office, International Search Report in International Patent Application No. PCT/US2017/041900, dated Nov. 28, 2017, 5 pp.

European Patent Office, Written Opinion in International Patent Application No. PCT/US2017/041900, dated Nov. 28, 2017, 8 pp.

Office Action in Russian Application No. 2019102377, dated Nov. 12, 2020, 12 pages (5 pages of English Translation and 7 pages of Official Copy).

Search Report in Russian Application No. 2019102377, dated Nov. 12, 2020, 4 pages (2 pages of English Translation and 2 pages of Official Copy).

Chinese Office Action in Application No. 201780042575.1, dated Aug. 18, 2020, 19 pages (11 pages English Translations and 8 pages Official Copy).

* cited by examiner

US 11,155,478 B2

METHOD FOR IMPROVING OVERFLOW CLARITY IN PRODUCTION OF COAL

This application is a nonprovisional application claiming the benefit of U.S. Provisional patent application Ser. No. 62/362,924, filed Jul. 15, 2016, the disclosure of which is incorporated herein by reference in its entirety.

BACKGROUND OF THE INVENTION

Generally, particulate matter suspended in a liquid is removed via filtration or settling (e.g., clarification, thickening, etc.). The particulate-laden liquid may be treated in order to aid in settling or filtration. A dual treatment regimen calls for treating the particulate-laden liquid with coagulant to destabilize the particulate suspension, and then treating the coagulated particulate-laden liquid with flocculant to aggregate the destabilized particulates in the liquid. The aggregated particles are generally larger in volume and weight, causing the aggregated particles to settle. Coagulants can be, for example, certain compounds of relatively low weight average molecular weight (e.g., less than about 500,000 Daltons) and relatively high charge density (e.g., 50-100 mole percent ionized groups). Flocculants can be, for example, certain compounds of relatively high weight average molecular weight (e.g., more than about 10,000,000 Daltons) and relatively low charge density (e.g., 0-30 mole percent ionized groups).

A typical coal mining operation produces coal from ore is that is mined from the earth. Generally, the coal is separated from the ore by flotation (i.e., froth flotation). The ore is crushed, and the crushed ore is transferred into a flotation process. The coal floats on the water, while the non-coal portion of the ore settles. However, coal flotation does not perfectly separate the coal from everything else. Furthermore, the flotation process produces a refuse stream (e.g., coal refuse) that, according to government regulation, cannot be discharged in its untreated form. Coal purification operators generally wish to remove as much of the remaining particulate material from the coal refuse before the water is discharged or recycled back into the process.

Generally, the remaining solid material in coal refuse has good colloidal stability and settles at a relatively slow rate, resulting in a top layer (e.g., overflow) having relatively high turbidity. Generally, for at least this reason, coal refuse has been treated with a dual treatment regimen such as the one described supra. As it relates to treatment of coal refuse, faster settling speed does not necessarily correlate with improved top layer clarity, and vice versa.

BRIEF SUMMARY OF THE INVENTION

A transitional treatment composition is provided. The transitional treatment composition comprises an anionic acrylate-acrylamide copolymer having from about 30 mole percent to about 50 mole percent (meth)acrylate, from about 50 mole percent to about 70 mole percent (meth)acrylamide, and a reduced specific viscosity of from about 18 dL/g to about 30 dL/g. The transitional treatment composition may be made down in an aqueous liquid (e.g., water).

A method of treating coal refuse is provided. The method comprises combining a transitional treatment composition and coal refuse. The transitional treatment composition comprises an anionic acrylate-acrylamide copolymer having from about 30 mole percent to about 50 mole percent (meth)acrylate, from about 50 mole percent to about 70 mole percent (meth)acrylamide, and a reduced specific viscosity of from about 18 dL/g to about 30 dL/g. In certain embodiments of the method, the transitional treatment composition is made down in an aqueous liquid (e.g., water).

Additionally, a method of separating water from coal refuse is provided. The method comprises combining a transitional treatment composition and coal refuse downstream of a coal flotation operation to form treated coal refuse. The transitional treatment composition comprises an anionic acrylate-acrylamide copolymer having from about 30 mole percent to about 50 mole percent (meth)acrylate, from about 50 mole percent to about 70 mole percent (meth)acrylamide, and a reduced specific viscosity of from about 18 dL/g to about 30 dL/g. In certain embodiments of the method, the transitional treatment composition is made down in an aqueous liquid (e.g., water). The treated coal refuse is allowed to stand in a settling vessel to form a top layer comprising water having turbidity less than about 200 NTU, and a bottom layer comprising settled treated coal refuse.

Additionally, use of a transitional treatment composition to aid in coal refuse thickening is provided. The transitional treatment composition comprises an anionic acrylate-acrylamide copolymer having from about 30 mole percent to about 50 mole percent (meth)acrylate, from about 50 mole percent to about 70 mole percent (meth)acrylamide, and a reduced specific viscosity of from about 18 dL/g to about 30 dL/g.

DETAILED DESCRIPTION OF THE INVENTION

Figure 1:
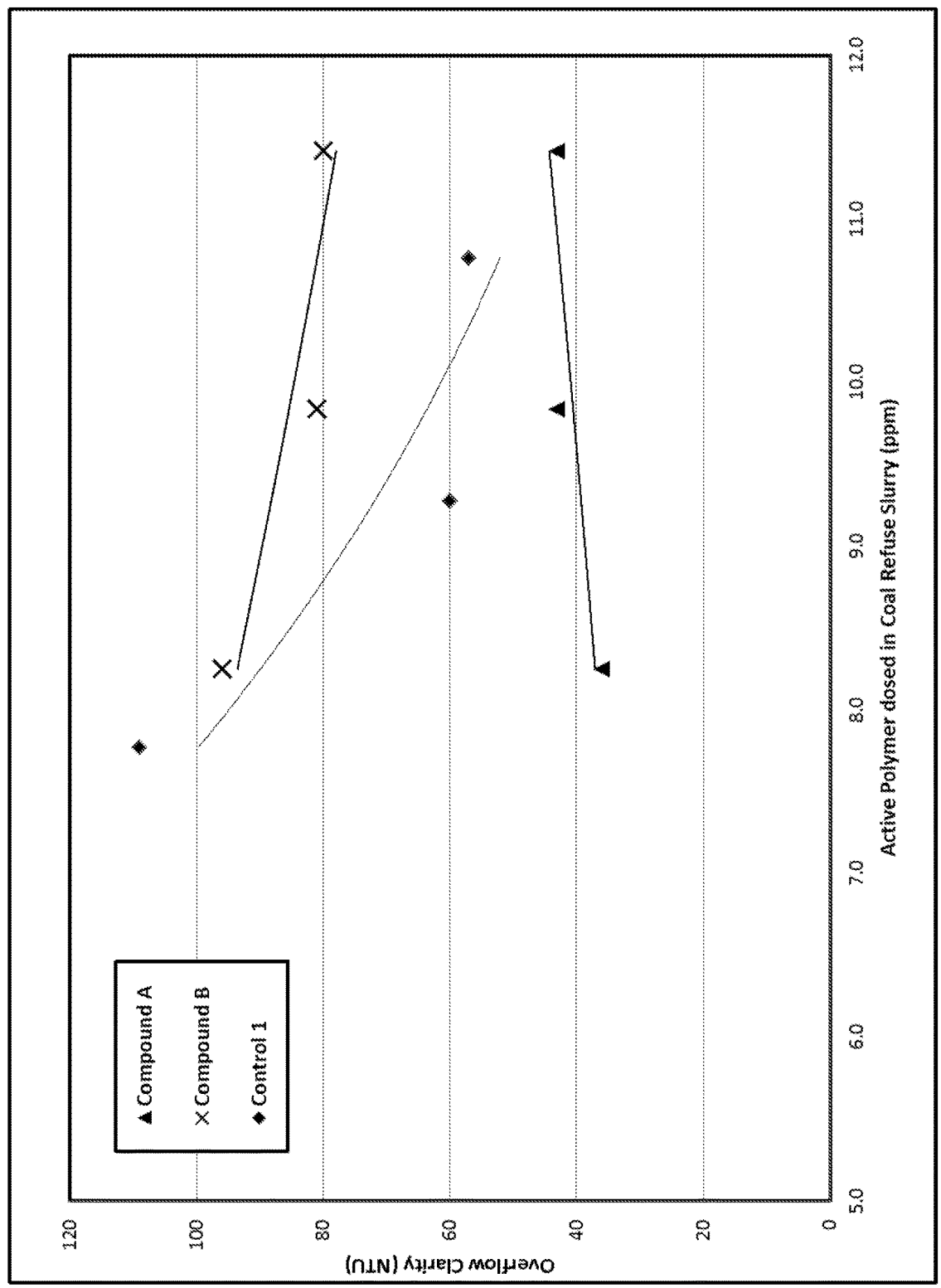
FIG. 1 graphically illustrates results of Example 1.

A transitional treatment composition is provided. The transitional treatment composition comprises an anionic acrylate-acrylamide copolymer having from about 30 mole percent to about 50 mole percent (meth)acrylate, from about 50 mole percent to about 70 mole percent (meth)acrylamide, and a reduced specific viscosity of from about 18 dL/g to about 30 dL/g. The transitional treatment composition may be made down in an aqueous liquid (e.g., water).

A method of treating coal refuse is provided. The method comprises combining a transitional treatment composition and coal refuse. The transitional treatment composition comprises an anionic acrylate-acrylamide copolymer having from about 30 mole percent to about 50 mole percent (meth)acrylate, from about 50 mole percent to about 70 mole percent (meth)acrylamide, and a reduced specific viscosity of from about 18 dL/g to about 30 dL/g. In certain embodiments of the method, the transitional treatment composition is made down in an aqueous liquid (e.g., water).

Additionally, a method of separating water from coal refuse is provided. The method comprises combining a transitional treatment composition and coal refuse downstream of a coal flotation operation to form treated coal refuse. The transitional treatment composition comprises an anionic acrylate-acrylamide copolymer having from about 30 mole percent to about 50 mole percent (meth)acrylate, from about 50 mole percent to about 70 mole percent (meth)acrylamide, and a reduced specific viscosity of from about 18 dL/g to about 30 dL/g. In certain embodiments of the method, the transitional treatment composition is made down in an aqueous liquid (e.g., water). The treated coal refuse is allowed to stand in a settling vessel to form a top layer comprising water having turbidity less than about 200 NTU, and a bottom layer comprising settled treated coal refuse.

Additionally, use of a transitional treatment composition to aid in coal refuse thickening is provided. The transitional treatment composition comprises an anionic acrylate-acrylamide copolymer having from about 30 mole percent to about 50 mole percent (meth)acrylate, from about 50 mole percent to about 70 mole percent (meth)acrylamide, and a reduced specific viscosity of from about 18 dL/g to about 30 dL/g.

A method of treating coal refuse, as well as a method of separating water from coal refuse, are provided. Generally, coal refuse is regarded as the resulting slurry downstream of a coal flotation operation, which is a type of froth flotation. Coal ore is refined using froth flotation, which results in a refuse stream that generally is further treated to separate the slurry into reasonably clear liquid matter and solid matter, though the solid matter tends to remain wet. Generally, downstream of the coal flotation operation, coal refuse is further processed via a coal refuse thickening application. As utilized herein, the phrase "coal refuse thickening application" includes both thickening and clarification, though sometimes "thickening" and "clarification" can be considered to be two distinct unit operations. A settling vessel may be, for example, either a thickener or a clarifier, or a combination of a thickener and a clarifier.

Generally, coal refuse comprises 1% to 30% or more by weight solids in water (e.g., slurry). Coal refuse generally comprises non-coal solids and some non-separated coal. Coal refuse can be black or gray in color.

The methods provided herein comprise combining a transitional treatment composition and coal refuse. A transitional treatment composition comprises an anionic acrylate-acrylamide copolymer having from about 30 mole percent to about 50 mole percent (meth)acrylate, and from about 50 mole percent to about 70 mole percent (meth)acrylamide, and a reduced specific viscosity of from about 18 dL/g to about 30 dL/g.

As is commonly utilized in the art, the term "(meth) acrylate" represents "acrylate, methacrylate, or a combination thereof," and the term "(meth)acrylamide" represents "acrylamide, methacrylamide, or a combination thereof." In certain embodiments of the methods described herein, the anionic acrylate-acrylamide copolymer comprises from about 30 mole percent, or from about 32 mole percent, or from about 34 mole percent or from about 36 mole percent, to about 50 mole percent, or to about 48 mole percent, or to about 46 mole percent, or to about 44 mole percent (meth) acrylate, and from about 50 mole percent, or from about 52 mole percent or from about 54 mole percent, or from about 56 mole percent, to about 70 mole percent, or to about 68 mole percent, or to about 66 mole percent, or to about 64 mole percent (meth)acrylamide. In certain embodiments of the methods described herein, the transitional treatment composition comprises an anionic acrylate-acrylamide copolymer having from about 36 mole percent to about 44 mole percent (meth)acrylate, and from about 56 mole percent to about 64 mole percent (meth)acrylamide, and more preferably, from about 36 mole percent to about 44 mole percent acrylate, and from about 56 mole percent to about 64 mole percent acrylamide.

Though somewhat related to (weight average) molecular weight measurements, polymers may be characterized by their reduced specific viscosity ("RSV"). As described herein, RSV values are determined from a 450 ppm anionic acrylate-acrylamide copolymer solution in 1-molar sodium nitrate using an Ubbelohde viscometer tube at 30° C. In certain embodiments of the methods described herein, the anionic acrylate-acrylamide copolymer has a RSV of from about 18 dL/g to about 30 dL/g. In certain embodiments of the methods described herein, the anionic acrylate-acrylamide copolymer has a RSV of from about 18 dL/g, or from about 19 dL/g, or from about 20 dL/g, or from about 21 dL/g, or from about 22 dL/g, to about 30 dL/g, or to about 29 dL/g, or to about 28 dL/g. In certain embodiments of the methods described herein, the anionic acrylate-acrylamide copolymer has a RSV of from about 22 dL/g to about 28 dL/g.

In certain embodiments of the methods described herein, the anionic acrylate-acrylamide copolymer has a weight average molecular weight of from about 4 million to about 7 million Daltons. In certain embodiments of the methods described herein, the anionic acrylate-acrylamide copolymer has a weight average molecular weight of from about 4 million, or from about 5 million, or from about 5.5 million, or from about 6 million, to about 7 million Daltons. Flocculants having higher weight average molecular weight would be expected to result in faster settling times and thus improved clarity of the top layer, the methods described herein, which utilize anionic acrylate-acrylamide copolymers having weight average molecular weights from about 4 million to about 7 million Daltons have been shown to provide improved settling and clarity in the top layer.

Weight average molecular weight can be determined in a variety of ways. As described herein, weight average molecular weight is generally determined using batch multi-angle light scattering ("MALS") of a 50 ppm solution of the copolymer in mobile phase (1.0 molar sodium chloride, 0.1 molar sodium biphosphate). The scattered light signal is collected as a function of angle and concentration with a multi-angle light scattering detector. The obtained data is fit to a light scattering equation, e.g., a Zimm plot, to determine the weight average molecular weight of the sample.

Additionally, in certain embodiments of the methods described herein, the anionic acrylate-acrylamide copolymer is (or has been) made down in an aqueous liquid. Generally, the aqueous liquid is water. However, the aqueous liquid may further include, e.g., a caustic component. In other words, the aqueous liquid may have a pH of from about 7 to about 14, or from about 7 to about 12, or from about 7 to about 11, or from about 7 to about 10, or from about 7 to about 9, or from about 7 to about 8. Examples of caustic components include, but are not limited to, ammonium hydroxide, sodium hydroxide, and potassium hydroxide. Generally, process water will be sufficiently pure to be utilized as the aqueous liquid or a component thereof, though the purity of the aqueous liquid will depend on the particular coal refuse thickening application of interest.

The anionic acrylate-acrylamide copolymer may be utilized in the methods without having been made down. In such methods, the transitional treatment composition is said to be combined "neat." Examples of neat transitional treatment compositions include, but are not limited to, water-in-oil (i.e., inverse) emulsion and dry powder. The term "product" can be utilized to describe neat transitional treatment compositions.

In certain embodiments of the methods described herein, neat transitional treatment composition is made down to form a transitional treatment composition comprising from about 100 ppm to about 20,000 ppm by weight neat transitional treatment composition in aqueous liquid. In certain embodiments of the methods described herein, neat transitional treatment composition is made down to form a transitional treatment composition comprising from about 100 ppm, or from about 300 ppm, or from about 500 ppm, or from about 1,000 ppm, or from about 3,000 ppm, or from about 5,000 ppm, to about 20,000 ppm, or to about 18,000 ppm, or to about 15,000 ppm by weight neat transitional treatment composition in aqueous liquid. When a water-in-oil emulsion, the neat transitional treatment composition generally comprises about 20% to about 40% by weight anionic acrylate-acrylamide copolymer. Thus, in certain embodiments of the methods described herein, the anionic acrylate-acryamide copolymer can be present in the transitional treatment composition at a concentration of from about 20 ppm to about 8,000 ppm by weight actives, or from about 20 ppm, or from about 100 ppm, or from about 1,000 ppm, to about 8,000 ppm, or to about 7,000 ppm, or to about 6,000 ppm by weight actives. Accordingly, the (neat) transitional treatment composition and the coal refuse may be combined to form treated coal refuse comprising, for example, from about 0.2 ppm to 200 ppm by weight actives of the transitional treatment composition. In other words, the dosage of (neat) transitional treatment composition added to the coal refuse is an amount to provide, for example, from about 0.2 ppm by weight to 200 ppm by weight actives. As used herein, the term "(neat) transitional treatment composition" is utilized to indicate that the transitional treatment composition and the coal refuse may be combined with or without make-down, or with partial make-down, of the transitional treatment composition.

In certain embodiments of the methods described herein, the transitional treatment composition is a dry powder, and the dry powder transitional treatment composition and coal refuse are combined via an auger immediately after flotation or cyclonation, if present.

The transitional treatment composition and the coal refuse may be combined via any suitable fashion. For example, the transitional treatment composition may be added to the coal refuse and blended. The blending may occur via any suitable method, for example, combined flow through a conduit, stirred tank, in-line mixing, etc. The transitional treatment composition may be introduced into a stream of the coal refuse, or vice versa, or streams of the transitional treatment composition and the coal refuse may be combined in any reasonable manner known to those of skill in the art.

In certain embodiments of the methods described herein, the transitional treatment composition and the coal refuse are combined via combined flow through a conduit. For example, in certain embodiments of the methods described herein, a stream of the transitional treatment composition is introduced into a stream of the coal refuse. In certain embodiments of the methods described herein, the transitional treatment composition and the coal refuse are combined at a plurality of feed points of the transitional treatment composition, which includes, for example, two feed points, three feed points, four feed points, five feed points, and so forth. In certain embodiments of the methods described herein, the transitional treatment composition and the coal refuse are combined via at least three feed points. Generally, the feed point(s) is/are located downstream of a flotation operation. In certain embodiments of the methods described herein, the feed point(s) is/are located in a centerwell of a thickener. In certain embodiments of the methods described herein, the feed point(s) is/are located upstream of a settling vessel.

In certain embodiments of the methods described herein, the method further comprises allowing the treated coal refuse to stand in a settling vessel to form a top layer comprising water having turbidity less than about 200 nephelometric turbidity units ("NTU"), and a bottom layer comprising settled treated coal refuse. In certain embodiments of the methods described herein, the top layer has a turbidity of less than about 100 NTU, or less than about 80 NTU, or less than about 60 NTU. In certain embodiments of the methods described herein, the bottom layer settles at a rate of from about 10 to about 15 inches per minute.

In certain embodiments of the methods described herein, the bottom layer of the treated coal refuse is transferred from the settling vessel. In certain embodiments of the methods described herein, the top layer of the treated coal refuse is transferred from the settling vessel. In certain embodiments of the methods described herein, both the bottom and top layers of the treated coal refuse are separately transferred from the settling vessel. In certain embodiments of the methods described herein, the top layer is transferred via an overflow weir from the settling vessel.

In certain embodiments of the methods described herein, the coal refuse comprises impurities including, but not limited to, one or more of silicates (e.g., clay, quartz), carbonates (e.g., calcite), sulfides (e.g., pyrite), and humates. Expandable clay refers to clay that generally swells in volume (e.g., at least about 1.5 times) when in aqueous slurry. Non-expandable clay refers to clay that generally does not swell in volume in as great of an amount as expandable clay. Examples of non-expandable clay include, but are not limited to, illite and kaolinite. Non-expandable clay tends to be present in appreciable amounts (e.g., from about 20% to about 80% by weight) in coal refuse from North American mines located east of the Rocky Mountains, and particularly east of the Mississippi River. For example, Illinois Basin and Ohio River/Appalachian Valley mines tend to produce coal ore comprising impurities including, but not limited to, non-expandable clay, quartz, calcite, and pyrite. The transitional treatment compositions described herein tend to perform unexpectedly well in settling particulates from coal refuse comprising non-expandable clay, particularly illite, kaolinite, or a combination thereof.

While the transitional treatment compositions described herein can be utilized in combination with coagulants and flocculants, in certain embodiments of the methods described herein, the transitional treatment composition and the coal refuse are combined without the aid of coagulant and/or flocculant. In certain embodiments of the methods described herein, the transitional treatment composition is the sole settling aid combined with the coal refuse. In other words, the coal refuse is not treated with any other settling aid (e.g., coagulant or flocculant) except for one or more transitional treatment compositions.

EXAMPLES

The following examples further illustrate the invention but should not be construed as in any way limiting its scope. For the examples, cylinder testing was utilized to determine settling rates. Supernatant (i.e., top layer, e.g., overflow) clarity was measured as well as settling rate. All samples were tested with various coal refuse samples from ore extracted in North America from east of the Rocky Mountains, and more specifically east of the Mississippi River, and all samples comprised non-expandable clay, including one or both of illite and kaolinite.

For the following examples, the following procedure was utilized:
1. Slurries of coal refuse were combined in a 60-quart valved kettle and agitated with an overhead mixer at a constant rate of approximately 100 rpm to keep all solids in suspension and maintain visual consistency of the slurry.
2. The valve on the kettle was opened to fill two (or more) graduated cylinders to the highest graduation. Care was taken to provide each of the graduated cylinders with slurries having similar particulate content.
3. A corresponding number of syringes of treatment composition(s) (e.g., transitional treatment composition) of interest were filled as necessary. The treatment composition(s) may be, e.g., two of the same composition, two different compositions, a single composition of differing dosages, etc.
4. The cylinders were plugged with stoppers and inverted by hand one or more times to re-suspend any settled particles.
5. The stoppers were removed and a portion of each syringe was injected into the respective cylinders.
6. The stoppers were replaced into the cylinders, and the cylinders inverted several times to mix the treated coal refuse.

Steps 5-6 were repeated three times to complete the dosage of each respective treatment composition. This method is sometimes referred to as "split-dosing" and is intended to simulate multiple feed points of the treatment composition (e.g., transitional treatment composition). For Control 2, the dosage of coagulant was injected as the first dose, and the dosage of flocculant was split and injected as the second and third doses. This method simulates the usual feed points of the dual treatment regimen.

7. After cylinder inversion several times, the cylinders were placed on a flat surface and a stopwatch was started. The solids-supernatant (i.e., bottom layer-top layer) interface was marked at time intervals of, e.g., 10 seconds, 15 seconds, 30 seconds, etc. The settling rate (e.g., free-fall settling rate) for each cylinder can be determined from the markings.

The following compositions were tested in the following examples, with each of Compositions A, B, C, and E representing embodiments of (neat) transitional treatment compositions:

TABLE 1

Samples tested in the Examples.

| Sample | Description | Reduced Specific Viscosity (dL/g) | Weight Average Molecular Weight (million Daltons) |
| --- | --- | --- | --- |
| Control 1 | Relatively high molecular weight acrylate-acrylamide copolymer flocculant (30 mole percent acrylate, 70 mole percent acrylalmide) | 32 | 6.1 |
| Control 2 | Dual treatment regimen (coagulant-flocculant); coagulant 100 mole percent anionic; flocculant same as Control 1 above | Coagulant: N/A (intrinsic viscosity approximately 1.2-2.1 dL/g) Flocculant: 32 | Coagulant: Less than 1 Flocculant: 6.1 |
| Compound A | Anionic acrylate-acryamide copolymer (40 mole percent acrylate, 60 mole percent acrylamide) | 19.1 | 4.8 |
| Compound B | Anionic acrylate-acryamide copolymer (50 mole percent acrylate, 50 mole percent acrylamide) | 19.8 | Not determined |
| Compound C | Anionic acrylate-acryamide copolymer (40 mole percent acrylate, 60 mole percent acrylamide) | 24.2 | 6.8 |
| Compound D | Anionic acrylate-acryamide copolymer (40 mole percent acrylate, 60 mole percent acrylamide) | 39.6 | 8.3 |
| Compound E | Anionic acrylate-acryamide copolymer (40 mole percent acrylate, 60 mole percent acrylamide) | 30.7 | 7.0 |
| Compound F | Anionic acrylate-acryamide copolymer (40 mole percent acrylate, 60 mole percent acrylamide) | 14.5 | 3.8 |
| Compound G | Anionic acrylate-acryamide copolymer (40 mole percent acrylate, 60 mole percent acrylamide) | 12.5 | 3.2 |

Example 1

FIG. 1 graphically illustrates the resulting top layer (labeled "overflow") clarity of treated coal refuse via the cylinder tests described herein. The data points and fitted lines show that a dose of Compound A at approximately 8.25 ppm actives, compared to a dose of 7.78 ppm actives of Control 1 and 8.25 ppm actives of Compound B, resulted in a clarity of less than 40 NTU, which is approximately 3 times more clear than Control 1.

Example 2

Figure 2:
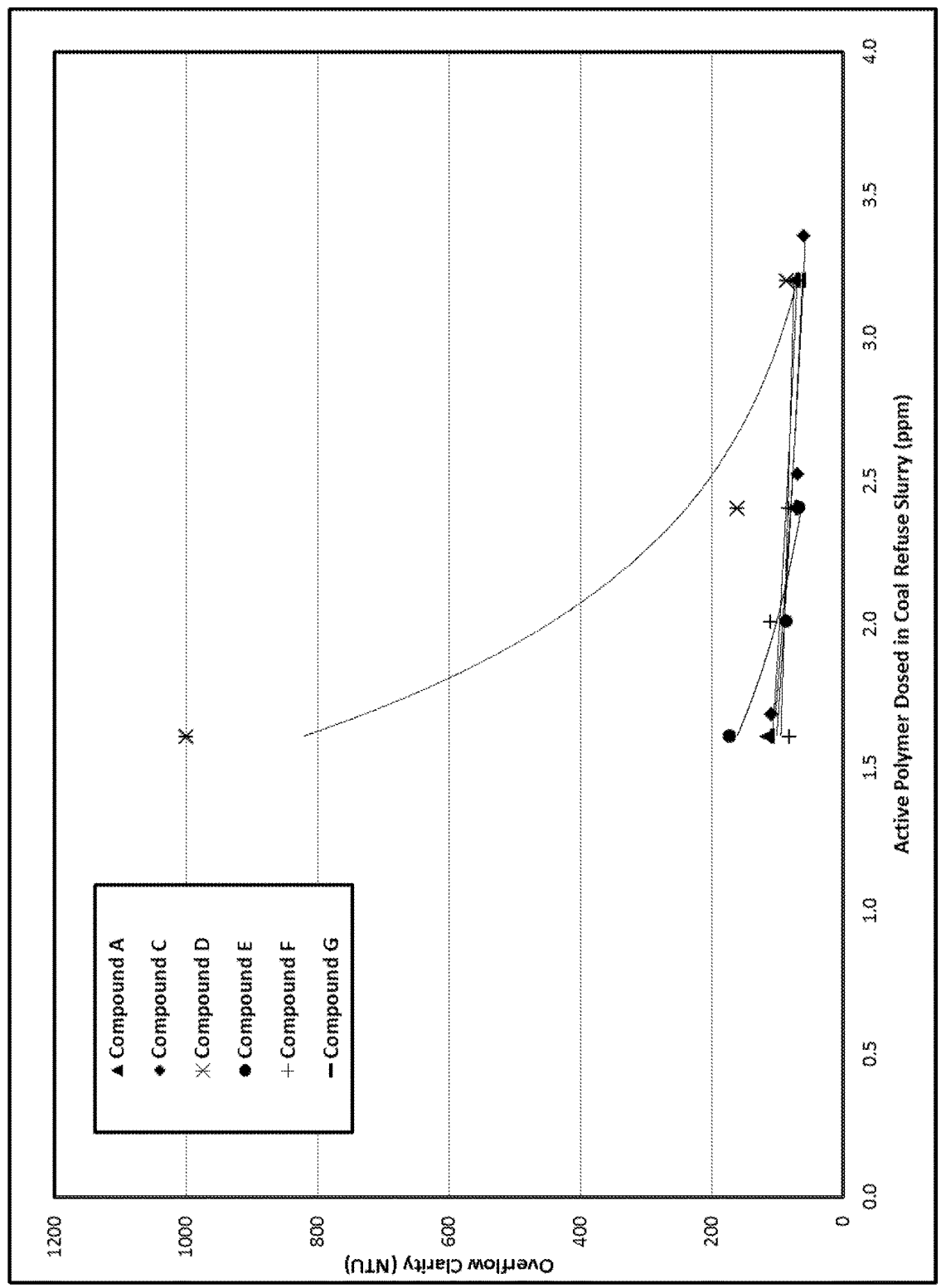
FIG. 2 graphically illustrates results of Example 2.

FIG. 2 graphically illustrates various compounds related to Compound A. Of note, Compounds D and G fall outside the about 18 to about 30 RSV range, with Compound G having an RSV of 12.5, and Compound D having an RSV of 39.6. FIG. 2 demonstrates that the anionic acrylate-acrylamide copolymer of the transitional treatment composition should have an RSV of about 18 to about 30, and a weight average molecular weight of about 4 million to about 7 million Daltons, which is surprising and contrary to the prevailing belief in the art Example 3

Figure 3:
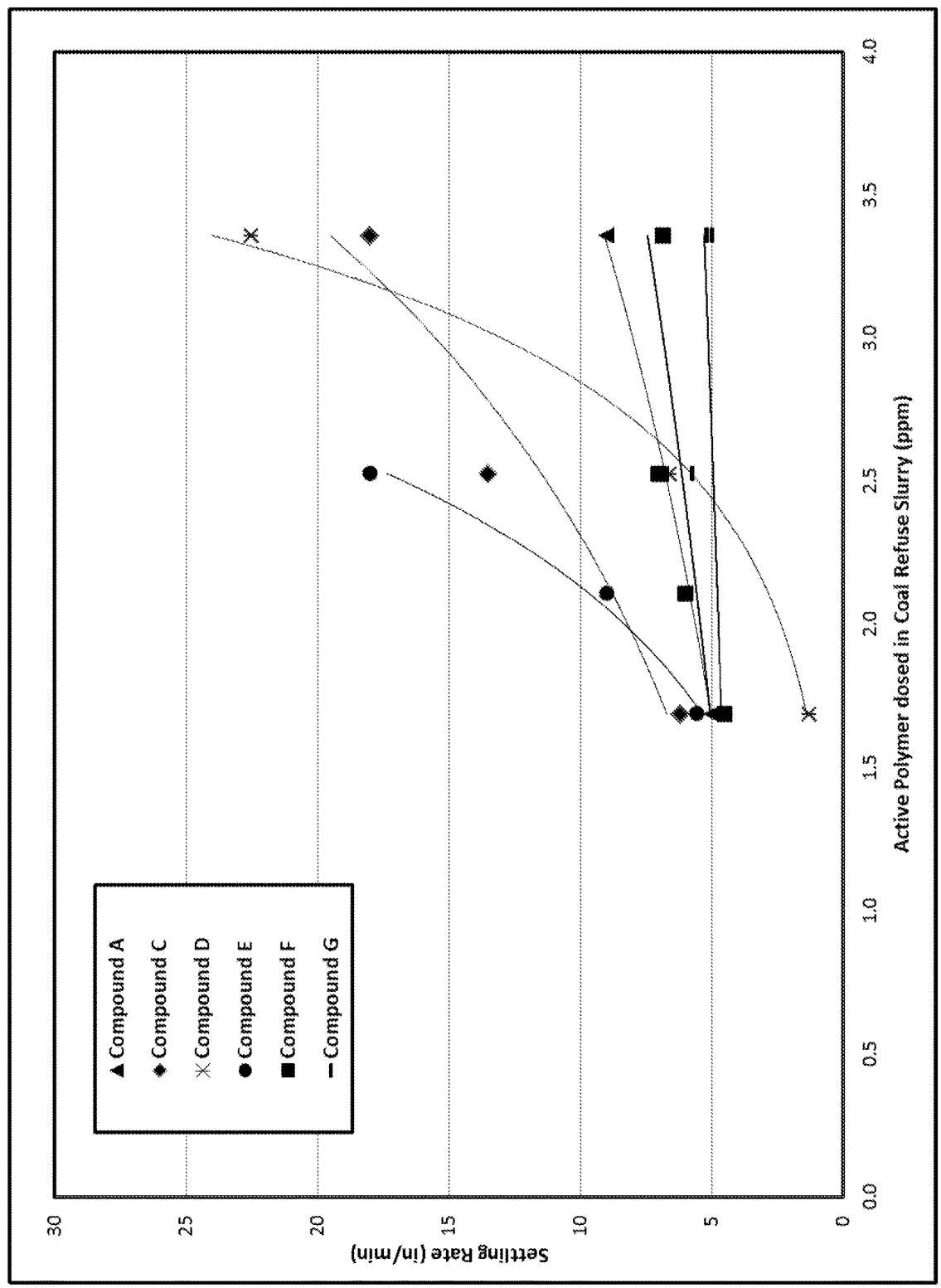
FIG. 3 graphically illustrates results of Example 3.

FIG. 3 graphically illustrates settling rate of the bottom layer versus actives dosage of Compounds A, C, D, E, F, and G. Settling rates of at least 10 inches per minute were achieved for certain doses of Compounds C, D, and E, though Compound D did not provide sufficient clarity in the top layer (see Example 2).

Example 4

Figure 4:
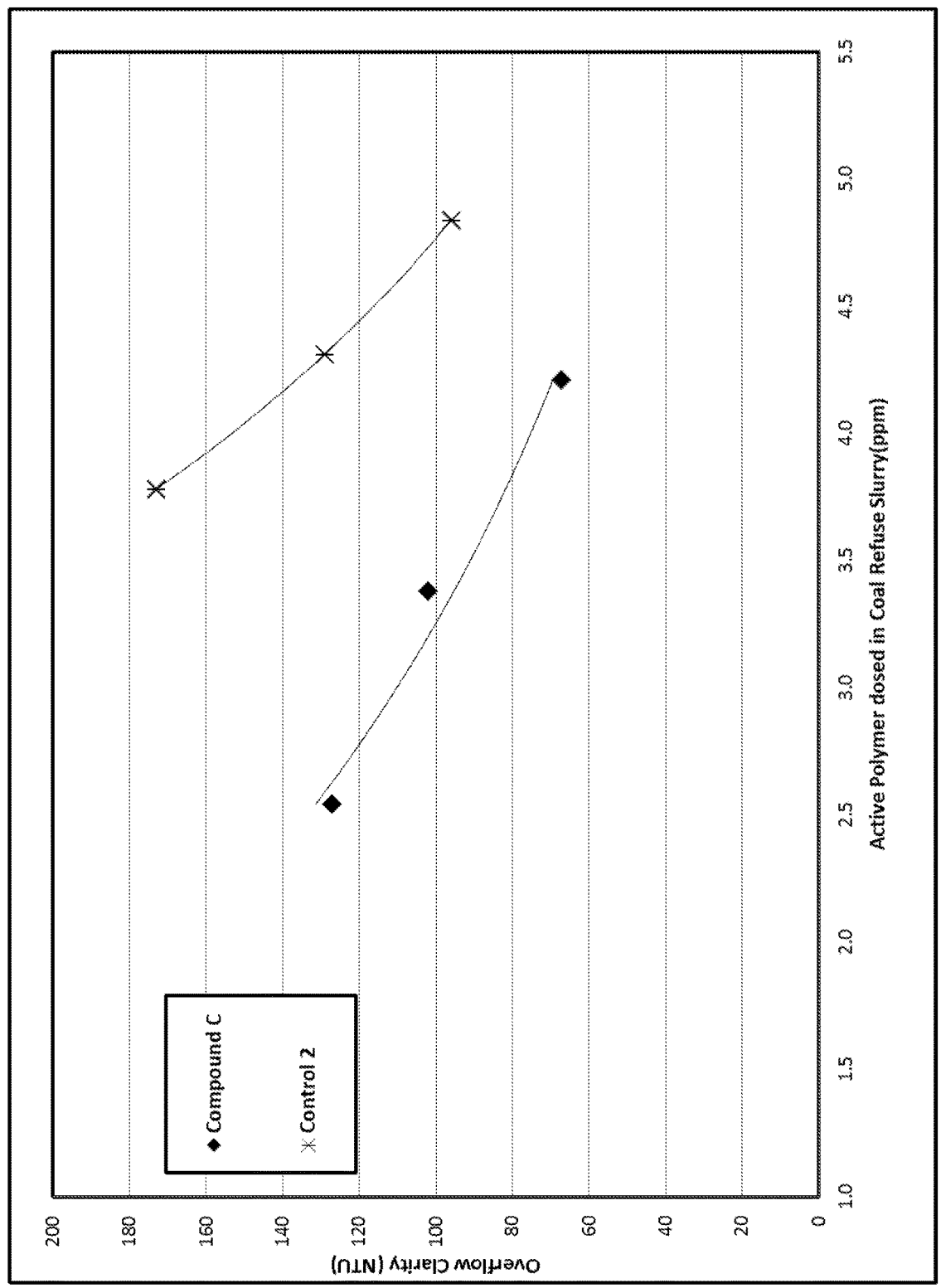
FIG. 4 graphically illustrates results of Example 4.

FIG. 4 graphically illustrates a comparison of top layer (labeled "overflow") clarity of Compound C and the usual dual treatment regimen of Control 2. Improved top layer clarity was achieved with less actives dose of Compound C as compared to Control 2.

Example 5

Figure 5:
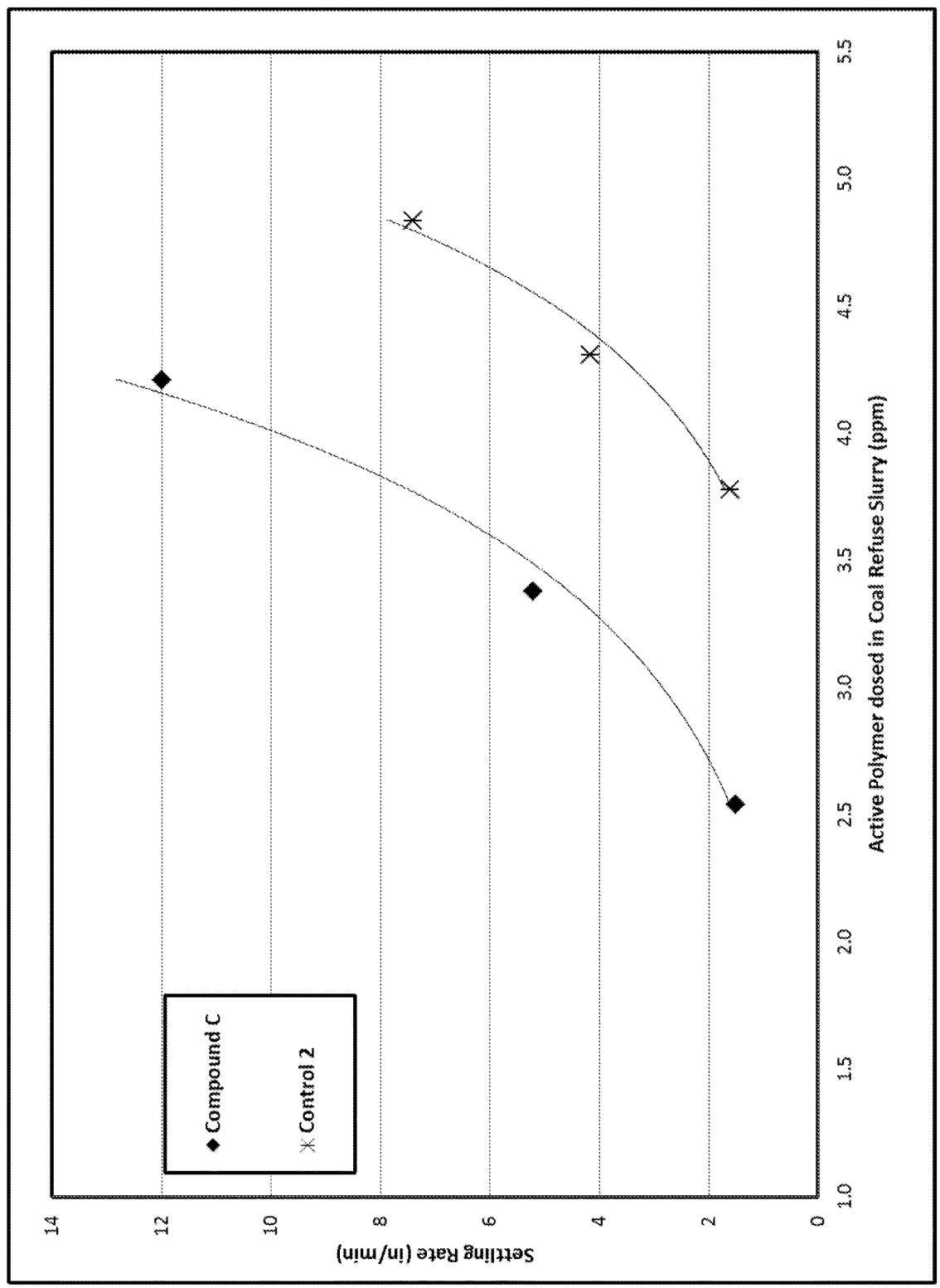
FIG. 5 graphically illustrates results of Example 5.

FIG. 5 graphically illustrates a comparison of settling rate of the bottom layer versus actives dose of Compound C as compared to the usual dual treatment regimen of Control 2. While utilizing less actives dose of Compound C than that of Control 2, 12 inches per minute settling rate was achieved utilizing Compound C.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A composition consisting of:
    a coal refuse comprising 20 wt % to 80 wt % non-expandable clay; and
    an anionic acrylate-acrylamide copolymer having from about 36 mole percent to about 44 mole percent (meth)acrylate and about 56 mole percent to about 64 mole percent (meth)acrylamide, and a reduced specific viscosity of from about 22 dL/g to about 28 dL/g.

2. The composition of claim 1, wherein the composition is aqueous slurry.

3. The composition of claim 1, wherein the (meth)acrylate is acrylate.

4. The composition of claim 1, wherein the (meth)acrylamide is acrylamide.

5. The composition of claim 1, wherein the anionic acrylate-acrylamide copolymer has a weight average molecular weight of from about 4 million to about 7 million Daltons.

6. The composition of claim 5, wherein the anionic acrylate-acrylamide copolymer has a weight average molecular weight of from about 5 million to about 7 million Daltons.

7. The composition of claim 6, wherein the anionic acrylate-acrylamide copolymer has a weight average molecular weight of from about 6 million to about 7 million Daltons.

8. The composition of claim 1, wherein the non-expandable clay comprises illite, kaolinite, or a combination thereof.

9. A method of treating coal refuse consisting of:
    combining an anionic acrylate-acrylamide copolymer having from about 36 mole percent to about 44 mole percent (meth)acrylate, from about 56 mole percent to about 64 mole percent (meth)acrylamide, and a reduced specific viscosity of from about 22 dL/g to about 28 dL/g and coal refuse comprising 20 wt % to 80 wt % non-expandable clay.

10. A method of separating water from coal refuse consisting of:
    combining an anionic acrylate-acrylamide copolymer having from about 36 mole percent to about 44 mole percent (meth)acrylate, from about 56 mole percent to about 64 mole percent (meth)acrylamide, and a reduced specific viscosity of from about 22 dL/g to about 28 dL/g and coal refuse comprising 20 wt % to 80 wt % non-expandable clay downstream of a coal flotation operation to form treated coal refuse; and
    allowing the treated coal refuse to stand in a settling vessel to form a top layer comprising water having turbidity less than about 200 NTU, and a bottom layer comprising settled treated coal refuse; and optionally, transferring at least a portion of a layer from the settling vessel.

11. The method of claim 10, further comprising transferring at least a portion of the bottom layer from the settling vessel.

12. The method of claim 10, further comprising transferring at least a portion of the top layer from the settling vessel.

13. The method of claim 12, wherein the portion of the top layer is transferred from the settling vessel via overflow.

14. The method of claim 10, wherein the top layer has a turbidity less than about 100 NTU.

15. The method of claim 10, wherein the top layer has a turbidity less than about 80 NTU.

16. The method of claim 10, wherein the top layer has a turbidity less than about 60 NTU.

17. The method of claim 10, wherein the bottom layer settles at a rate of from about 10 to about 15 inches per minute.

18. The method of claim 10, wherein the anionic acrylate-acrylamide copolymer and the coal refuse are combined at a plurality of feed points of the anionic acrylate-acrylamide copolymer.

19. The method of claim 18, wherein the plurality of feed points is at least three feed points.

\* \* \* \* \*